US009253212B2

(12) United States Patent
Tejerina et al.

(10) Patent No.: US 9,253,212 B2
(45) Date of Patent: Feb. 2, 2016

(54) AUTOMATED PRODUCTION OF CERTIFICATION CONTROLS BY TRANSLATING FRAMEWORK CONTROLS

(71) Applicant: Microsoft Technology Licensing, LLC, Redmond, WA (US)

(72) Inventors: David Nunez Tejerina, Bellevue, WA (US); Shawn Veney, Kirkland, WA (US); Melissa Rodriguez, Kirkland, WA (US); Gregory Roberts, Seattle, WA (US); Arthur J. Schwab, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 99 days.

(21) Appl. No.: 14/035,760

(22) Filed: Sep. 24, 2013

(65) Prior Publication Data

US 2015/0089567 A1    Mar. 26, 2015

(51) Int. Cl.
*H04L 29/06* (2006.01)
*H04L 9/00* (2006.01)

(52) U.S. Cl.
CPC ............ *H04L 63/20* (2013.01); *H04L 63/0823* (2013.01); *H04L 9/006* (2013.01)

(58) Field of Classification Search
CPC ...... H04L 63/0823; H04L 9/006; H04L 63/20
See application file for complete search history.

(56) References Cited

U.S. PATENT DOCUMENTS 7,475,151 B2 *  1/2009  Delany ................ H04L 63/102
                                                      707/E17.005
2004/0250062 A1 * 12/2004  Douglas ............... H04L 9/3263
                                                      713/156

(Continued)

OTHER PUBLICATIONS

Office Action received for U.S. Appl. No. 14/037,368, mailed Jan. 5, 2015 and filed on Sep. 26, 2013.

(Continued)

*Primary Examiner* — Eleni Shiferaw
*Assistant Examiner* — Nelson Giddins
(74) *Attorney, Agent, or Firm* — Louise Bowman; Jim Ross; Micky Minhas

(57) ABSTRACT

A compliance application automatically produces certification controls by translating framework controls. The framework controls are common certification controls used in production of the certification. The application retrieves framework controls including metadata from a compliance framework data store. Metadata of the framework controls map the framework controls to the certification. In addition, the application retrieves certification parity data associated with the metadata. Certification controls are produced based on the framework controls and the certification parity data. A view of the certification including the certification controls is provided to a customer requesting the certification.

19 Claims, 6 Drawing Sheets

(56) References Cited

U.S. PATENT DOCUMENTS

| | | | |
|---|---|---|---|
| 2005/0010819 A1* | 1/2005 | Williams | H04L 12/2602 726/4 |
| 2005/0091067 A1 | 4/2005 | Johnson | |
| 2005/0228688 A1 | 10/2005 | Visser et al. | |
| 2005/0257267 A1 | 11/2005 | Williams et al. | |
| 2006/0059026 A1 | 3/2006 | King et al. | |
| 2006/0090206 A1 | 4/2006 | Ladner et al. | |
| 2007/0124797 A1* | 5/2007 | Gupta | H04L 63/102 726/1 |
| 2008/0183459 A1* | 7/2008 | Simonsen | G06F 17/289 704/1 |
| 2008/0189788 A1* | 8/2008 | Bahl | G06F 21/577 726/25 |
| 2008/0270316 A1 | 10/2008 | Guidotti et al. | |
| 2009/0007264 A1* | 1/2009 | Chatterjee | G06F 21/577 726/22 |
| 2009/0187963 A1* | 7/2009 | Bori | G06F 21/51 726/1 |
| 2009/0205011 A1* | 8/2009 | Jain | G06F 8/65 726/1 |
| 2009/0205012 A1* | 8/2009 | Jain | G06F 21/577 726/1 |
| 2011/0112974 A1* | 5/2011 | Hinton | G06Q 10/06 705/317 |
| 2012/0117608 A1* | 5/2012 | Metke | H04L 63/0823 726/1 |
| 2013/0198799 A1* | 8/2013 | Staggs | H04L 63/105 726/1 |
| 2013/0205364 A1* | 8/2013 | Kiehtreiber | H04L 63/20 726/1 |
| 2013/0227636 A1 | 8/2013 | Bettini et al. | |
| 2013/0298244 A1 | 11/2013 | Kumar et al. | |
| 2014/0109176 A1* | 4/2014 | Barton | G06F 9/45533 726/1 |
| 2014/0337528 A1* | 11/2014 | Barton | H04L 63/10 709/225 |

OTHER PUBLICATIONS

"Symantec™ Control Compliance Suite", Published on: Sep. 16, 2008, Available at: http://eval.symantec.com/mktginfo/enterprise/fact_sheets/b-datasheet_control_compliance_suite_9.0-06_11_2008.en-us.pdf.

Kharbili, et al., "Towards a Framework for Semantic Business Process Compliance Management", In Proceedings of the Workshop on Governance, Risk and Compliance for Information Systems, Jun. 17, 2008, 15 pages.

"IT Governance, Risk Management and Compliance", Retrieved on: Jul. 30, 2013, Available at: http://www.tecnocomputacion.com/images/pdf/modulo-riskmanager-overview.pdf.

"Compliance Auditor Software Features", Retrieved on: Jul. 30, 2013, Available at: http://www.avatier.com/products/identity-management/access-governance/compliance-auditor/features/.

"International Search Report and Written Opinion Issued in PCT Patent Application No. PCT/US2014/056425", Mailed Date: Dec. 3, 2014, 7 Pages.

Final Office Action received for U.S. Appl. No. 14/037,368, mailed Jun. 12, 2015 and filed on Sep. 26, 2013.

"Second Written Opinion Issued in PCT Application No. PCT/US2014/056425", Mailed Date: Sep. 8, 2015, 5 pages.

* cited by examiner

AUTOMATED PRODUCTION OF CERTIFICATION CONTROLS BY TRANSLATING FRAMEWORK CONTROLS

BACKGROUND

The proliferation of computerized automation of processes in every aspect of life, data storage and processing have become a major component of networked systems handling financial and other transactions. In such systems, data is entered, modified, or deleted from a number of sources. The same data is maintained in multiple data stores in same or different formats, and a data store has to pick up or synchronize changes to data based on changes in a different store. Various data stores from simple tables to complicated databases is maintained and synchronized as new entries or modifications are made by different sources. The changes are synchronized at regular intervals. In addition, variety of services are offered to enable internal and external parties' interactivity with the data hosted by the data stores. Consumers of the data as well as providers usually demand the services to comply with security rules to assure continued authorized operations.

Compliance certifications define extensive security rules. A service subject to compliance is burdened to conform with the extensive security rules. Usually additional certifications associated with a service describe similar security rules. As such, a service subject to multiple certifications is burdened with expensive audit demands scrutinizing the certifications separately. Resources are wasted to audit services with multiple certifications sharing common rules. In addition, any changes to the certifications enforce additional audits on the certifications further wasting resources to audit the common rules of the certifications.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to automated production of certification controls by translating framework controls. A compliance application may receive a request to view a certification from a customer. The compliance application may retrieve framework controls including metadata. The metadata may map the framework controls to the certification. In addition, the application may retrieve certification parity data associated with the metadata. Certification controls may be produced based on the framework controls and the certification parity data. Next, the application may provide a view of the certification including the certification controls.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
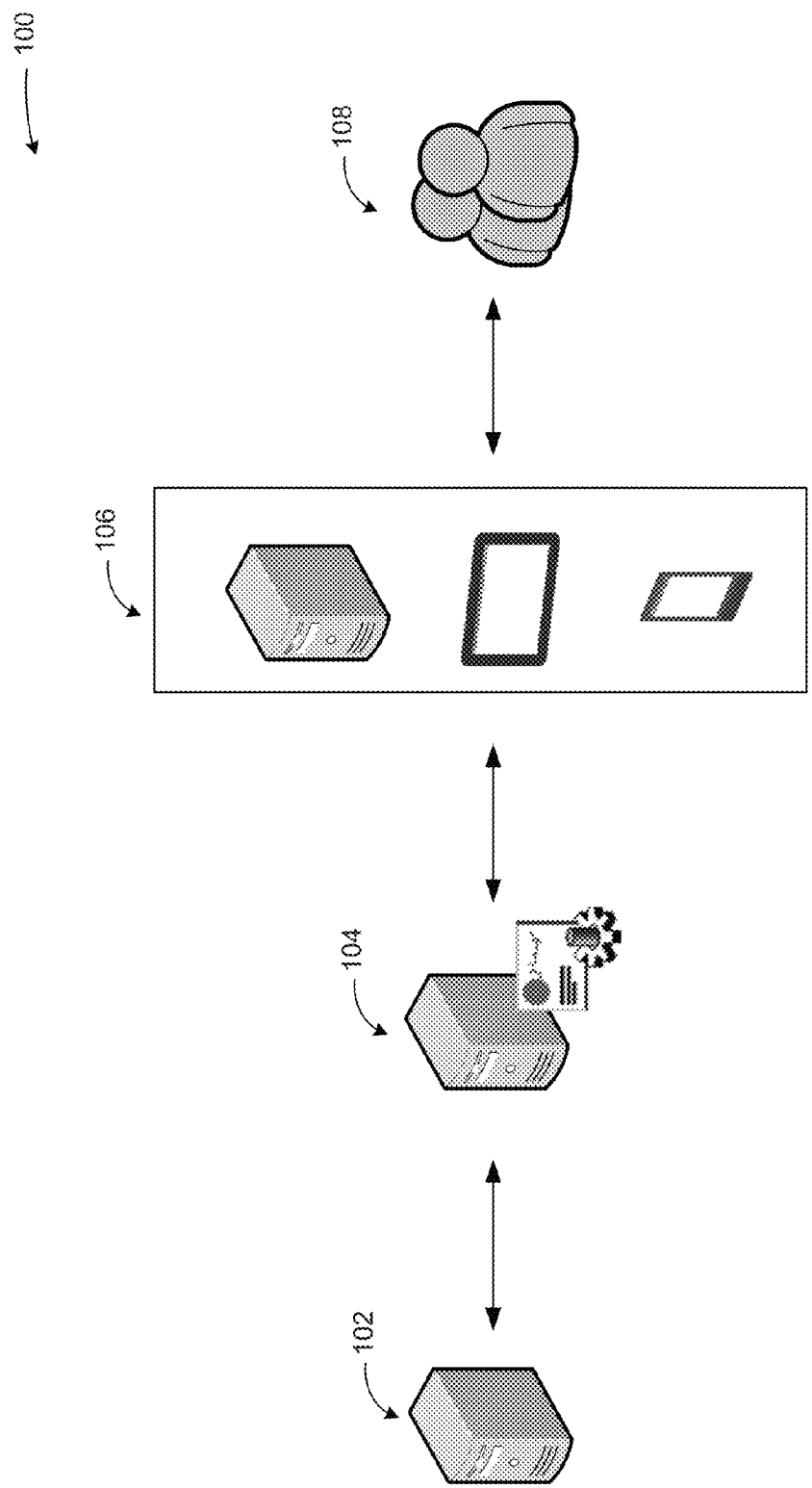
FIG. 1 is a conceptual diagram illustrating automated production of certification controls by translating framework controls, according to embodiments.

As briefly described above, certification controls may be automatically produced by translating framework controls. In response to receiving a request to view a certification, a compliance application may retrieve framework controls including metadata that maps to the certification. Certification controls may be produced based on the framework controls and certification parity data associated with the metadata. A view of the certification including the certification controls may be provided to a customer.

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, and a flash drive.

Throughout this specification, the term "platform" may be a combination of software and hardware components to automate production of certification controls by translating framework controls. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example embodiments may be found in the following description.

FIG. 1 includes diagram 100 illustrating automated production of certification controls by translating framework controls, according to embodiments.

A compliance application executing on a server 104 may automatically produce certification controls by translating framework controls. The server 104 may be a security server executing applications and services associated with providing certifications associated with services to external entities. The server 104 may host framework controls. Framework controls may be common controls used to produce certification controls. The certification controls may be combined to produce a certification. The framework controls may include metadata mapping the framework controls to certification controls. A translation layer of the compliance application may translate the framework controls to certification controls based on the metadata and certification parity data associated with the metadata.

A server 102 may execute automation components associated with certification controls. Automation components may be enabled to establish a connection to the translation layer and perform a compliance test on the framework controls to determine production of certification controls. Results of the compliance test may be used to update the certification parity data associated with the metadata of the framework controls.

The certification controls may be used to provide a view of the certification to a customer 108. A view of the certification may be provided to the customer 108 through user interface on devices 106. Devices 106 may include a desktop computer, a tablet computer, a notebook computer, a smart phone, and similar ones.

While the example system in FIG. 1 has been described with specific components including a server 102 translating framework controls to certification controls, embodiments are not limited to these components or system configurations and can be implemented with other system configuration employing fewer or additional components. In an alternate example, the compliance application may be executed in server 102 along with the automation components. The approaches discussed here may be applied to any compliance process provided by an application and/or a server using the principles described herein.

Figure 2:
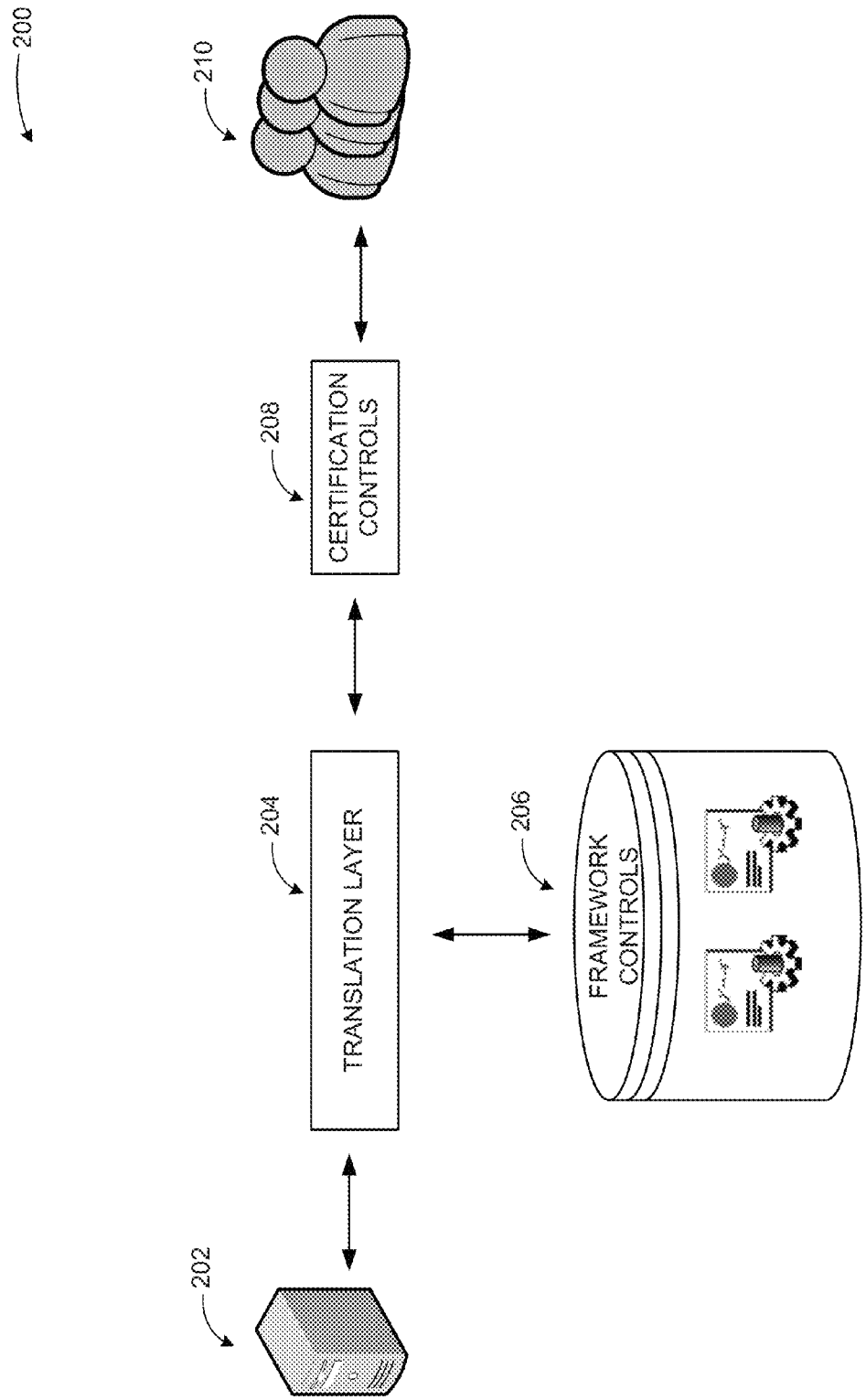
FIG. 2 is a component diagram of a scheme to automate production of certification controls by translating framework controls, according to embodiments.

FIG. 2 is a component diagram of a scheme to automate production of certification controls by translating framework controls. Diagram 200 illustrates an example compliance translation layer 204 translating framework controls to certification controls 208.

The compliance application may receive a request for a certification from a customer 210. The compliance application may retrieve framework controls 206 based on metadata of the framework controls 206 that map the framework controls to the certification. The request for the certification may include attributes of the certification. The attributes including a service identifier, a security description, an expiration date, and similar ones may be compared to the metadata. Service identifier may identify the service associated with the certification. The service may be a process provided by an external or an internal application to external or internal entities such as applications and users. The certification may be used to validate the service to the external or internal entities.

The framework controls 206 for the certification may be selected based on the metadata of the framework controls. The metadata may be matched to the attributes of the certification described by the request. In addition, the framework controls 206 may be retrieved from a framework data store. The framework data store may be a compliance data store.

The translation layer may also retrieve certification parity data associated with the metadata. The certification parity data may retrieved from a parity data store. The certification parity data and the framework controls 206 may be processed to produce the certification controls 208. Alternatively, an automation component 202 may be enabled to connect to the translation layer 204 and perform a compliance test of the framework controls 206. The framework controls 206 may be tested to determine whether the framework controls may be translated to the certification controls 208. A result of the compliance test may be used to update the certification parity data.

The certification controls 208 may be used to produce the certification. A user interface may be used to provide a view of the certification to the customer 210.

Figure 3:
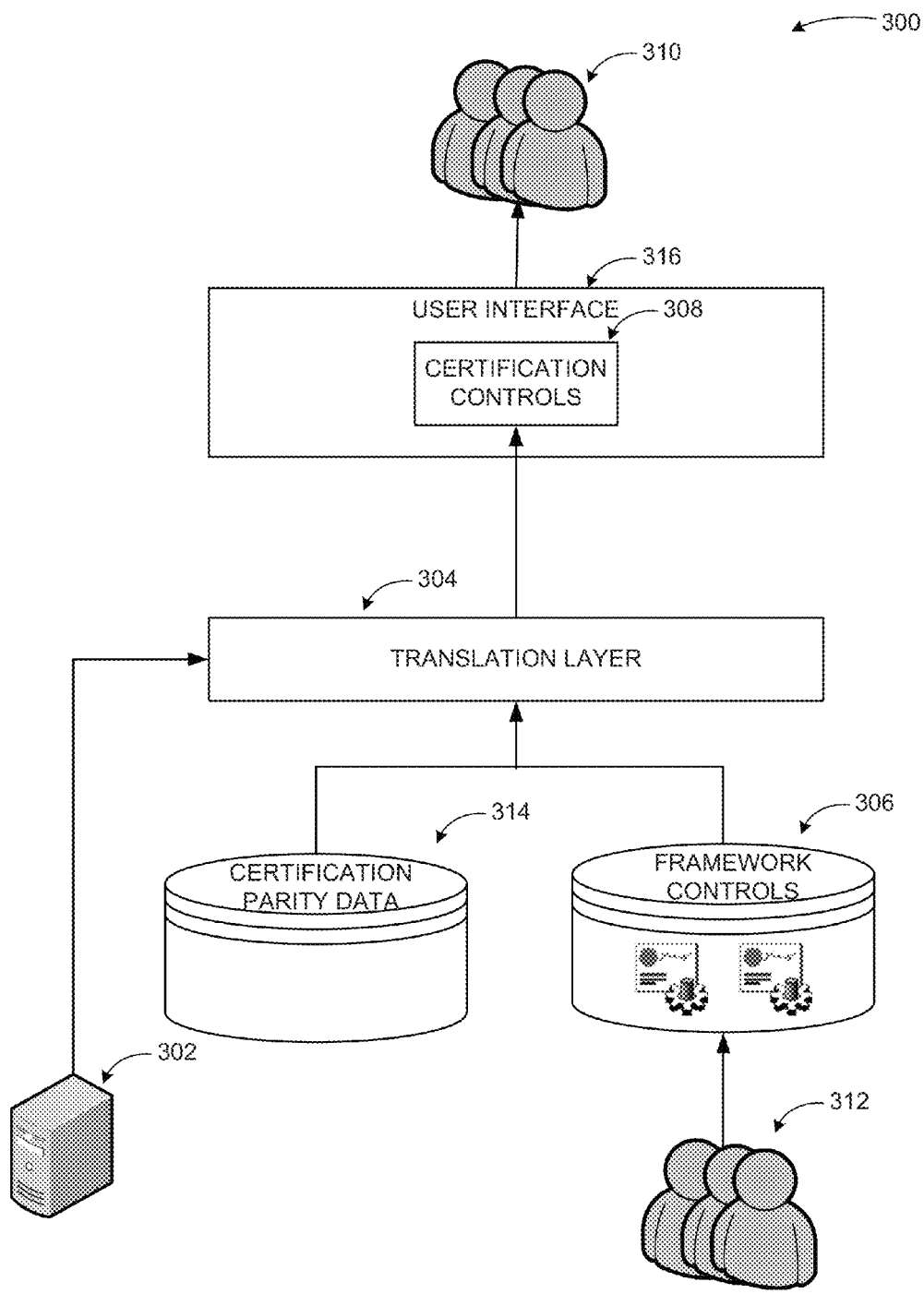
FIG. 3 is an example of automatically producing certification controls by translating framework controls, according to embodiments.

FIG. 3 is an example of automatically producing certification controls by translating framework controls, according to embodiments.

As shown in the diagram 300, a translation layer 304 may combine framework controls 306 and certification parity data 314 to produce certification controls 308. The certification controls 308 may be presented to the customer 310 within a certification through a user interface 316.

A team 312 may be enabled to modify and update the framework controls 306. The framework controls 306 may be a subset of common certification controls. As such, the team 312 may frequently update the framework controls 306 to reflect changes associated with the subset. A large set of framework controls 306 may be used to produce a large variety of certifications. As a result, frequency of updates to the framework controls 306 may be important to follow current trends associated with production of certifications. The compliance application may transmit an alert to the team 312 to prompt the team 312 to update the framework controls 306. The alert may be an email message, a text message, and similar ones. The alert may include description information associated with the framework controls, a time value since a last update, and similar ones. The frequency of transmitting the alert may be determined based on a volume of additional requests for additional certifications. In addition, the team 312 may include an engineering team, a management team, an operation team, a compliance team, and similar ones.

The compliance application may detect evidence associated with dependency information of the framework controls 306 within the certification parity data 314. The evidence may be utilized to comply with a compliance test validating the dependency information of the framework controls 306. As stated previously, an automation component 302 may be enabled to connect to the translation layer 304 and execute the compliance test. The certification parity data 314 may be updated to produce certification controls 308 in compliance with a certification authority. The certification authority may be the customer 310. The customer 310 may include an external auditor, a potential customer, and similar ones.

The evidence, the compliance test, the framework controls, and the certification parity data may be used to produce the certification controls within a common audit. A service associated with the certification may be certified to a certification authority during the common audit. Alternatively, the evidence, the compliance test, the framework controls, and the certification parity data may be used to produce additional certifications within a multi audit. Multiple certifications may be associated with multiple services. Additional services associated with additional certifications may be certified to a certification authority perceptive of mapping techniques used in the framework controls, during the multi audit. Awards for the certification may be received simultaneously from the certification authority.

The framework controls 306 may also be used to automate the certification of a service. In an example scenario, the compliance application may monitor or audit a service to produce a report. The report may be translated via the certification parity data 314 to provide customers, auditors, and other interested parties an understanding of the compliance posture of a service in relation to the associated certification.

The example scenarios and schemas in FIGS. 2 and 3 are shown with specific components, data types, and configurations. Embodiments are not limited to systems according to these example configurations. Automated production of certification controls by translating framework controls may be implemented in configurations employing fewer or additional components in applications and user interfaces. Furthermore, the example schema and components shown in FIGS. 2 and 3 and their subcomponents may be implemented in a similar manner with other values using the principles described herein.

Figure 4:
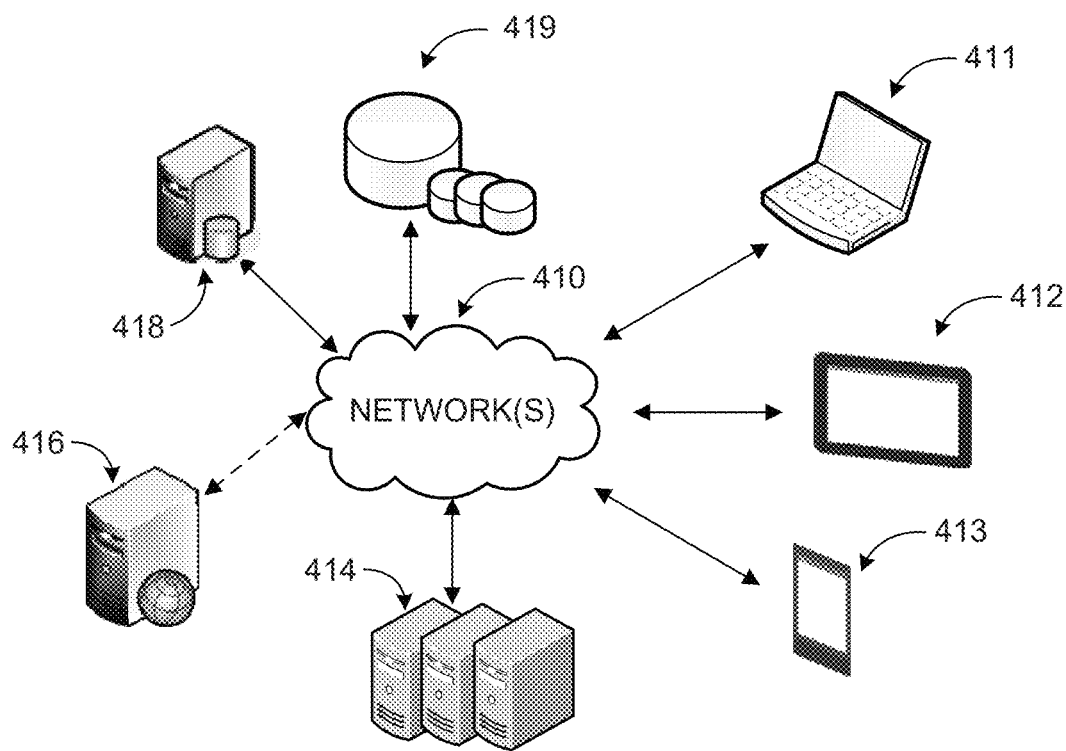
FIG. 4 is a simplified networked environment, where a system according to embodiments may be implemented.

FIG. 4 is an example networked environment, where embodiments may be implemented. A system automatically producing certification controls by translating framework controls may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may facilitate communications via application(s) executed by servers 414, or on individual server 416. A compliance application may receive a request to view a certification. The application may retrieve framework controls including metadata that map the framework controls to the certification and certification parity data associated with the metadata. Certification controls may be produced based on the framework controls and the parity data. The compliance application may provide a view of the certification including the certification controls. the certification controls and the certification parity data may be stored in data store(s) 419 directly or through database server 418.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to automate production of certification controls by translating framework controls. Furthermore, the networked environments discussed in FIG. 4 are for illustration purposes only. Embodiments are not limited to the example applications, modules, or processes.

Figure 5:
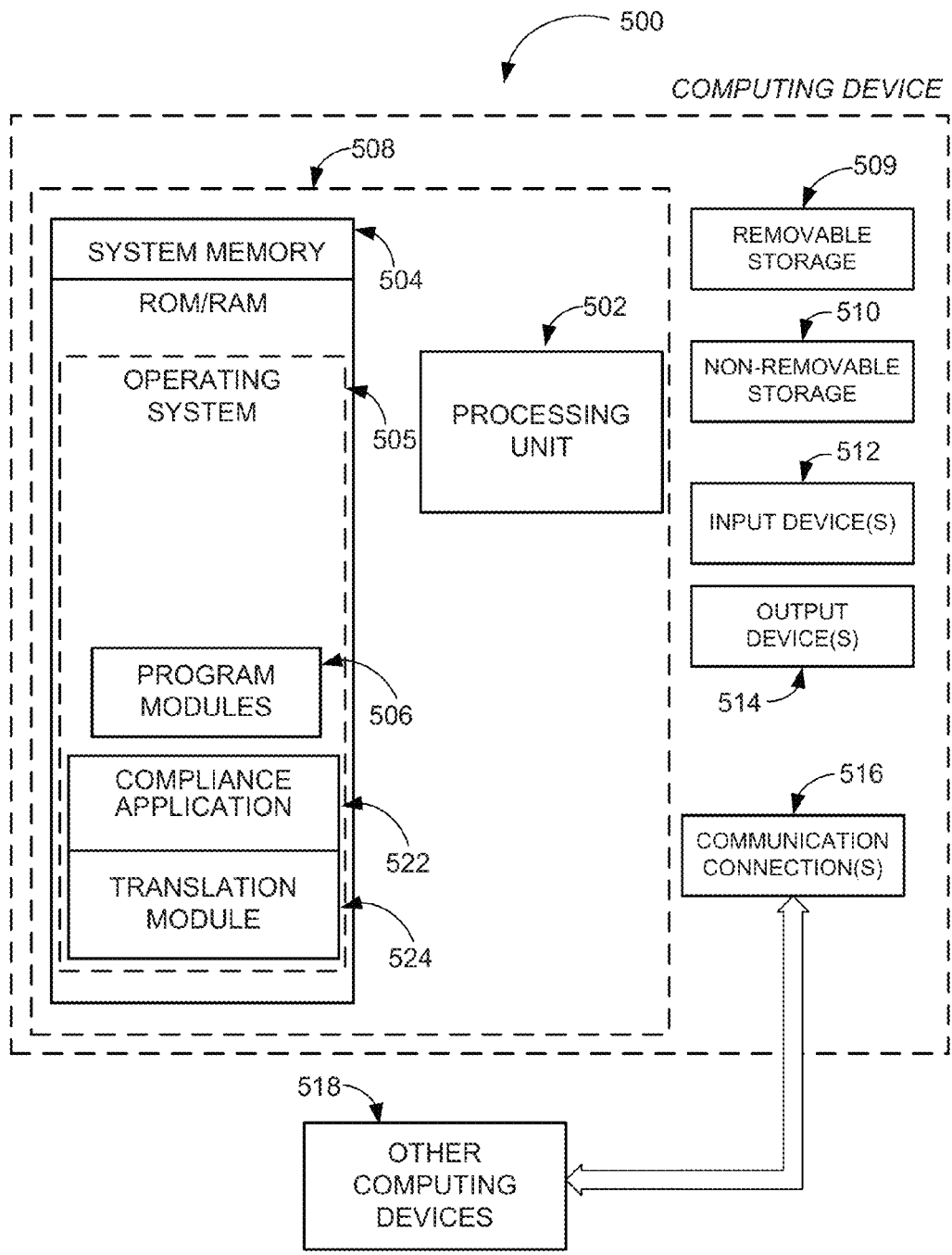
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be any computing device executing a compliance application according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, a compliance application 522, and a translation module 524.

The compliance application 522 may automatically produce certification controls by translating framework controls. The compliance application 522 may receive a request to view a certification. The compliance application 522 may retrieve framework controls including metadata that map the framework to the certification and certification parity data associated with the metadata. The translation module 524 may produce certification controls based on the framework controls and the certification parity data. The compliance application 522 may also provide a view of the certification including the certification controls through a user interface. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, an optical capture device for detecting gestures, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
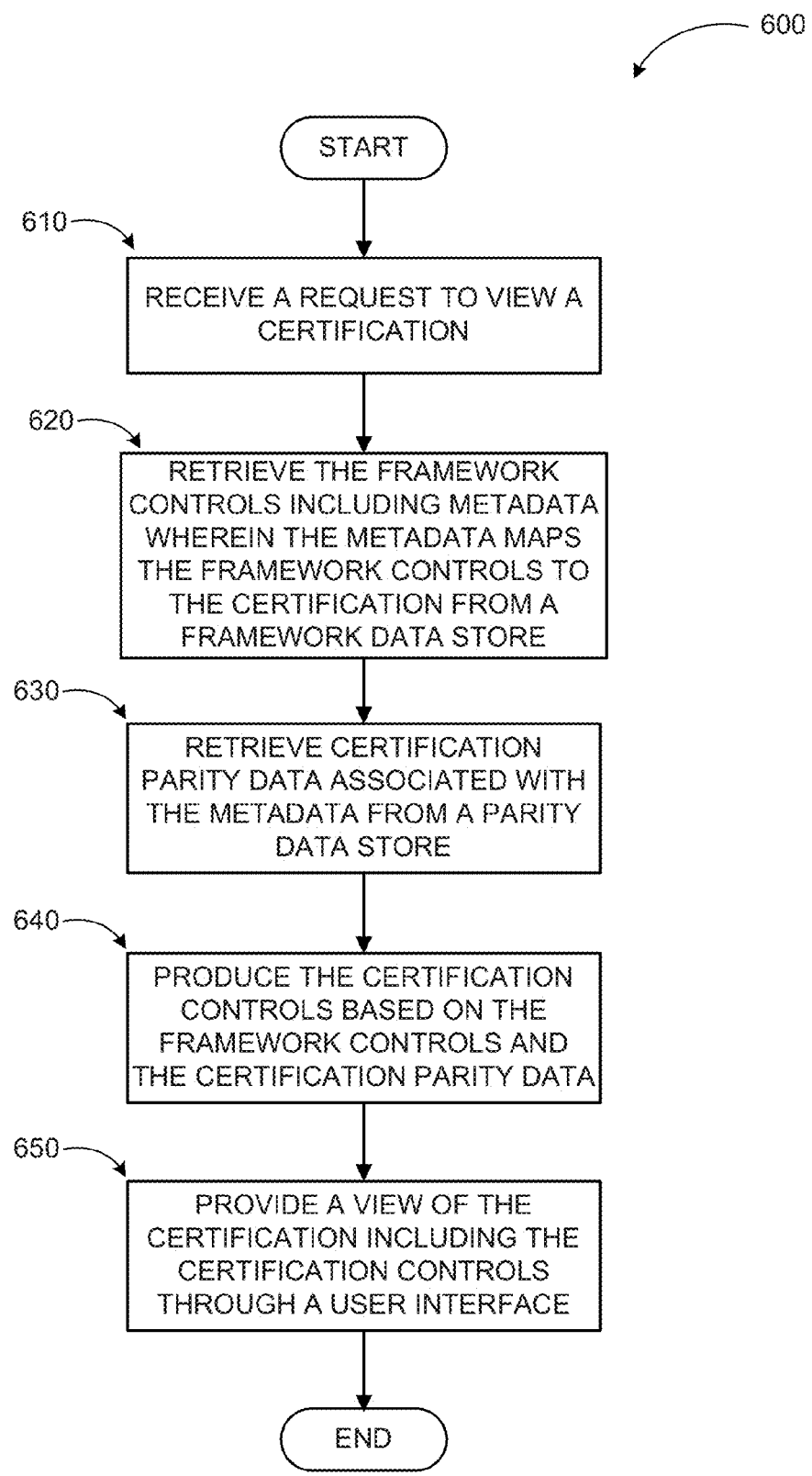
FIG. 6 illustrates a logic flow diagram for a process to automate production of certification controls by translating framework controls according to embodiments.

FIG. 6 illustrates a logic flow diagram for a process to automate production of certification controls by translating framework controls according to embodiments. Process 600 may be implemented on a compliance application.

Process 600 begins with operation 610 receiving a request to view a certification. The compliance application may retrieve framework controls including metadata that map the framework controls to the certification at operation 620. Attributes of the certification defined by the request may be matched to the metadata to select the framework controls. At operation 630, the compliance application may retrieve certification parity data associated with the metadata. Next, certification controls may be produced based on the framework controls and the certification parity data at operation 640. A view of the certification including the certification controls may be provided through a user interface at operation 650.

The operations included in process 600 are for illustration purposes. A compliance application may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed on a computing device to automate production of certification controls by translating framework controls, the method comprising:

receiving a request to view a certification at a compliance application that is being executed on a first server, wherein the certification is a compliance certification associated with a service that defines one or more security rules for the service;

retrieving, by the compliance application, the framework controls including metadata from a framework data store, wherein the metadata maps the framework controls to the certification;

retrieving, by the compliance application, certification parity data associated with the metadata from a parity data store;

producing, by the compliance application, the certification controls based on the framework controls and the certification parity data through a translation layer of the compliance application;

establishing, by an automation component that is being executed on a second server, a connection to the translation layer of the compliance application;

executing, by the automation component, a compliance test on the framework controls to determine whether the framework controls translate to the certification controls; and providing, by the compliance application, a view of the certification including the certification controls through a user interface.

2. The method of claim 1, further comprising:

receiving the request at the compliance application from a customer including one or more of: an external auditor, a potential customer, and a certification authority.

3. The method of claim 1, further comprising:

automating, by the compliance application, the certification by translating a report using the certification parity data, wherein the report is produced by at least one from a set of: monitoring and reporting a service associated with the certification.

4. The method of claim 1, further comprising:

enabling, by the compliance application, a team to update the framework controls, wherein the team includes at least one from a set of: an engineering team, a management team, an operation team, and a compliance team.

5. The method of claim 4, further comprising:

transmitting, by the compliance application, an alert to the team to prompt the team to update the framework controls.

6. The method of claim 1, further comprising:

matching, by the compliance application, the metadata to attributes of the certification described by the request.

7. The method of claim 6, further comprising:

comparing, by the compliance application, the attributes including one or more of: a service identifier, a security description, and an expiration date to the metadata.

8. The method of claim 1, further comprising:

producing, by the compliance application, the certification controls through the translation layer by translating the framework controls using the certification parity data.

9. The method of claim 1, further comprising:

updating, by the compliance application, the certification parity data based on a result of the compliance test executed by the automation component.

10. A system to automate production of certification controls by translating framework controls, the system comprising:

a first server computing device configured to execute a compliance application associated with providing a certification associated with a service to one or more external entities, wherein the compliance application is configured to:
receive a request to view the certification from a customer including at least one from a set of: an external auditor and a potential customer, wherein the certification is a compliance certification associated with the service that defines one or more security rules for the service;
retrieve the framework controls including metadata, wherein the metadata maps the framework controls to the certification from a framework data store;
retrieve certification parity data associated with the metadata from a parity data store;
produce the certification controls based on the framework controls and the certification parity data through a translation layer of the compliance application; and
provide a view of the certification including the certification controls through a user interface; and
a second server computing device configured to execute an automation component associated with the certification controls, the automation component configured to:
establish a connection to the translation layer of the compliance application; and
execute a compliance test on the framework controls to determine whether the framework controls translate to the certification controls.

11. The system of claim 10, wherein the compliance application is further configured to:
detect evidence associated with dependency information of the framework controls within the certification parity data, wherein the evidence is data obtained from the certification parity data.

12. The system of claim 11, wherein the compliance application is further configured to:
utilize the evidence obtained from the certification parity data to comply with
the compliance test
validating the dependency information; and
update the certification parity data with a result of the compliance test to produce the certification controls in compliance with a certification authority.

13. The system of claim 12, wherein the compliance application is further configured to:
utilize the evidence obtained from the certification parity data, the compliance test, the framework controls, and the certification parity data to produce the certification within a common audit.

14. The system of claim 13, wherein the compliance application is further configured to:
certify a service associated with the certification to a certification authority during the common audit.

15. The system of claim 12, wherein the compliance application is further configured to:
utilize the evidence, the compliance test, the framework controls, and the certification parity data to produce additional certifications within a multi audit.

16. The system of claim 15, wherein the compliance application is further configured to:
certify additional services associated with the additional certifications to a certification authority perceptive of mapping techniques used in the framework controls, during the multi audit.

17. A computer-readable memory device with instructions stored thereon to automate production of certification controls by translating framework controls, the instructions comprising:
receiving a request to view a certification at a compliance application that is being executed on a first server, wherein the certification is a compliance certification associated with a service that defines one or more security rules for the service;
retrieving, by the compliance application the framework controls including metadata, wherein the metadata maps the framework controls to the certification from a framework data store;
retrieving, by the compliance application certification parity data associated with the metadata from a parity data store;
detecting, by the compliance application, evidence associated with dependency information of the framework controls within the certification parity data, wherein the evidence is data obtained from the certification parity data;
utilizing, by the compliance application, the evidence to comply with a compliance test validating the dependency information;
producing the certification controls based on the framework controls and the certification parity data through a translation layer of the compliance application;
establishing, by an automation component that is being executed on a second server, a connection to the translation layer of the compliance application;
executing, by the automation component, the compliance test on the framework controls to determine whether the framework controls translate to the certification controls; and
providing, by the compliance application, a view of the certification including the certification controls through a user interface.

18. The computer-readable memory device of claim 17, wherein the instructions further comprise:
utilizing, by the compliance application, the evidence obtained from the certification parity data, the compliance test, the framework controls, and the certification parity data to produce the certification within a common audit; and
certifying, by the compliance application, a service associated with the certification to a certification authority during the common audit.

19. The computer-readable memory device of claim 17, wherein the instructions further comprise:
utilizing, by the compliance application, the evidence obtained from the certification parity data, the compliance test, the framework controls, and the certification parity data to produce additional certifications within a multi audit; and
certifying, by the compliance application, additional services associated with the additional certifications to a certification authority perceptive of mapping techniques used in the framework controls, during the multi audit.

* * * * *